US007138586B1

(12) United States Patent
Kim

(10) Patent No.: US 7,138,586 B1
(45) Date of Patent: Nov. 21, 2006

(54) REFRIGERATOR WITH SCALE

(76) Inventor: Brian S. Kim, 7004 Calle Del Pajarito, Rancho Palos Verdes, CA (US) 90275

( * ) Notice: Subject to any disclaimer, the term of this patent is extended or adjusted under 35 U.S.C. 154(b) by 0 days.

(21) Appl. No.: 11/498,929

(22) Filed: Aug. 3, 2006

(51) Int. Cl.
G01G 19/52 (2006.01)

(52) U.S. Cl. ............... 177/126; 177/143; 177/144; 177/244

(58) Field of Classification Search ............ 177/126, 177/142–144, 244
See application file for complete search history.

(56) References Cited

U.S. PATENT DOCUMENTS

| | | | | |
|---|---|---|---|---|
| 1,389,533 A * | 8/1921 | Sackett | ................. | 177/143 |
| 1,852,973 A * | 4/1932 | Justus | ................. | 177/143 |
| 2,685,441 A * | 8/1954 | Baade | ................. | 177/126 |
| 4,108,363 A * | 8/1978 | Susumu | ................. | 235/383 |
| 4,288,131 A * | 9/1981 | Griffin | ................. | 312/245 |
| 4,582,151 A * | 4/1986 | Mairot et al. | ............ | 177/144 |
| 4,669,029 A * | 5/1987 | Svenson et al. | ........... | 361/728 |
| 5,376,761 A * | 12/1994 | Koch et al. | ................. | 177/145 |
| 6,781,067 B1 * | 8/2004 | Montagnino et al. | .... | 177/25.13 |
| 6,864,436 B1 * | 3/2005 | Nobes et al. | ............ | 177/25.13 |

\* cited by examiner

*Primary Examiner*—Randy W. Gibson
(74) *Attorney, Agent, or Firm*—John K. Park; Park Law Firm

(57) ABSTRACT

A refrigerator with weighing scale includes a refrigerator and a weighing scale. The refrigerator includes a chamber with top, bottom, front, rear, side surfaces, and a control board, and the weighing scale is attached to the bottom surface of the refrigerator. The weighing scale is retractable from under the bottom surface of the refrigerator. The weighing scale includes a digital scale. The digital scale includes a stepping pad and a display for showing the weight. The display of the digital scale is disposed on the control board of the refrigerator, and the display is electronically connected to the remaining portion of the digital scale. The display on the control board of the refrigerator is turned on by stepping on the stepping pad of the weighing scale, by a control switch provided on the control board, or by being pulled out from under the bottom surface of the refrigerator.

17 Claims, 2 Drawing Sheets

REFRIGERATOR WITH SCALE

BACKGROUND OF THE INVENTION

The present invention relates to a refrigerator with a weighing scale. More particularly, this invention relates to a refrigerator that provides a weighing scale at a close reach from where most people want to weigh themselves.

A refrigerator can be defined as a device that isolates a certain volume of space from the vast environmental space and cools down the temperature in the isolated volume of space lower than the environmental space by means of a well-known heat pump.

The cooled down or temperature-controlled space has been used to store all kinds of food. It is believed that the drastic extension of life expectancy of modern people is mainly thanks to the availability of fresh food and clean water enabled by the introduction of the refrigerator and the running water system.

Also, the place around the refrigerator became where people want to weigh themselves most in the era of health and fitness. As the demand for physical activity keeps diminishing and the amount of calorie intake keeps increasing, the fitness has become an indispensable part of life of people who are interested in health and physical beauty.

Accordingly, a need for a refrigerator with weighing scale has been present for a long time considering the usage of refrigerators everywhere and the growing interest on health and fitness of general people. This invention is directed to satisfy the long-felt need and to solve some related problems.

SUMMARY OF THE INVENTION

The present invention contrives to solve the disadvantages of the prior art.

An object of the invention is to provide a refrigerator with weighing scale.

Another object of the invention is to provide a refrigerator with weighing scale at a close range from the refrigerator.

Still another object of the invention is to provide a refrigerator with weighing scale that saves space and time.

For the purpose of the invention, a refrigerator with weighing scale is provided.

The refrigerator with weighing scale includes a refrigerator and a weighing scale.

The refrigerator includes a chamber with a top surface, a bottom surface, a front surface, a rear surface, side surfaces, and a control board, and the weighing scale is attached to the bottom surface of the refrigerator.

The weighing scale is retractable from under the bottom surface of the refrigerator. The weighing scale is pushed in to save space when it is not in use. It can be pushed easily with the toe tip.

The weighing scale includes a digital scale. The digital scale includes a stepping pad and a display for showing the weight.

The display of the digital scale is disposed on the control board of the refrigerator, and the display is electronically connected to the remaining portion of the digital scale.

The display on the control board of the refrigerator is turned on by stepping on the stepping pad of the weighing scale, by a control switch provided on the control board, or by being pulled out from under the bottom surface of the refrigerator.

The weighing scale includes resting props on the bottom of the weighing scale. The resting props are foldable, and the resting props are folded when the weighing scale is pushed in and unfolded when the weighing scale is pulled out.

The weighing scale includes an analog scale. The analog scale includes a stepping pad and a display. The display includes a scale-and-needle type display and a digital display.

The refrigerator with weighing scale may further include a fixing device for attaching the weighing scale to the bottom surface of the refrigerator. The fixing device includes sliding rails and stoppers.

The sliding rails are provided on the bottom side of the refrigerator, and the stoppers are provided at the ends of the sliding rails.

The weighing device may include a locking device. The weighing scale pops out when pushed in by a predetermined pressure on the retracted weighing scale, and the weighing scale is folded in and clicked to stay inside when pushed in by the predetermined pressure.

The advantages of the present invention are: (1) the refrigerator with weighing scale is convenient to use two totally different but closely related equipments in people's everyday life in one place; (2) the refrigerator with weighing scale helps people who are interested in fitness; and (3) the refrigerator with weighing scale is easy to read the weight on the control board of the refrigerator.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
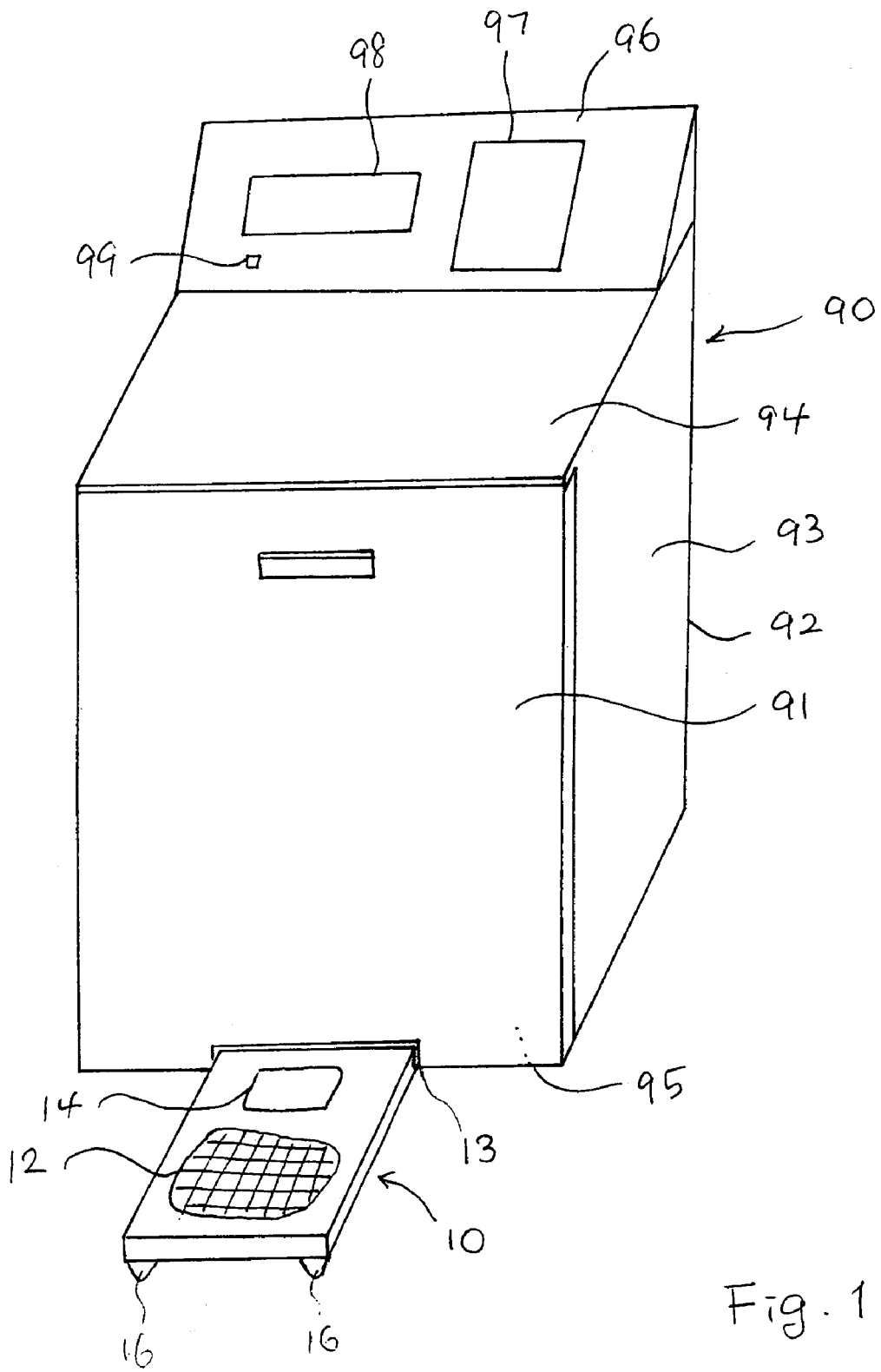
FIG. 1 is a perspective view of a refrigerator with shelf a weighing scale extracted from under the refrigerator according to the present invention.

FIG. 1 shows a refrigerator with a weighing scale 100.

The refrigerator with weighing scale 100 includes a refrigerator 90 and a weighing scale 10.

The refrigerator 90 includes a chamber with a top surface 94, a bottom surface 95, a front surface 91, a rear surface 92, side surfaces 93, and a control board 96, and the weighing scale 10 is attached to the bottom surface 95 of the refrigerator 90.

The weighing scale 10 is retractable from under the bottom surface 95 of the refrigerator 90. The weighing scale 10 is pushed in to save space when it is not in use. It can be pushed easily with the toe tip.

The weighing scale 10 includes a digital scale. The digital scale includes a stepping pad 12 and a display 14 for showing the weight.

The display 14 of the digital scale 10 maybe disposed on the control board 96 of the refrigerator 90, and the display 98 is electronically connected to the remaining portion of the digital scale 10.

When the weighing scale 10 is digital, especially when the display 14 of the weighing scale 10 is digital, the display 98 on the control board 96 of the refrigerator 90 is turned on by stepping on the stepping pad 12 of the weighing scale 10, by a control switch 99 provided on the control board 96, or by being pulled out from under the bottom surface 95 of the refrigerator 90. Also, the stepping pressure itself on the stepping pad 12 can turn on the display 14 of the weighing scale 10. Then, the display 14 is always in off state, and then turns on when someone is stepping up the stepping pad 12.

The weighing scale 10 includes resting props 16 on the bottom of the weighing scale 10. The resting props 16 are foldable, and the resting props 16 are folded when the weighing scale 10 is pushed in and unfolded when the weighing scale 10 is pulled out. The weighing scale 10 can pop out from under the refrigerator 90 when pushed a little further.

The weighing scale 10 includes an analog scale. The analog scale includes a stepping pad 12 and a display 14. The display 14 includes a traditional scale-and-needle type display and a digital display.

Figure 2:
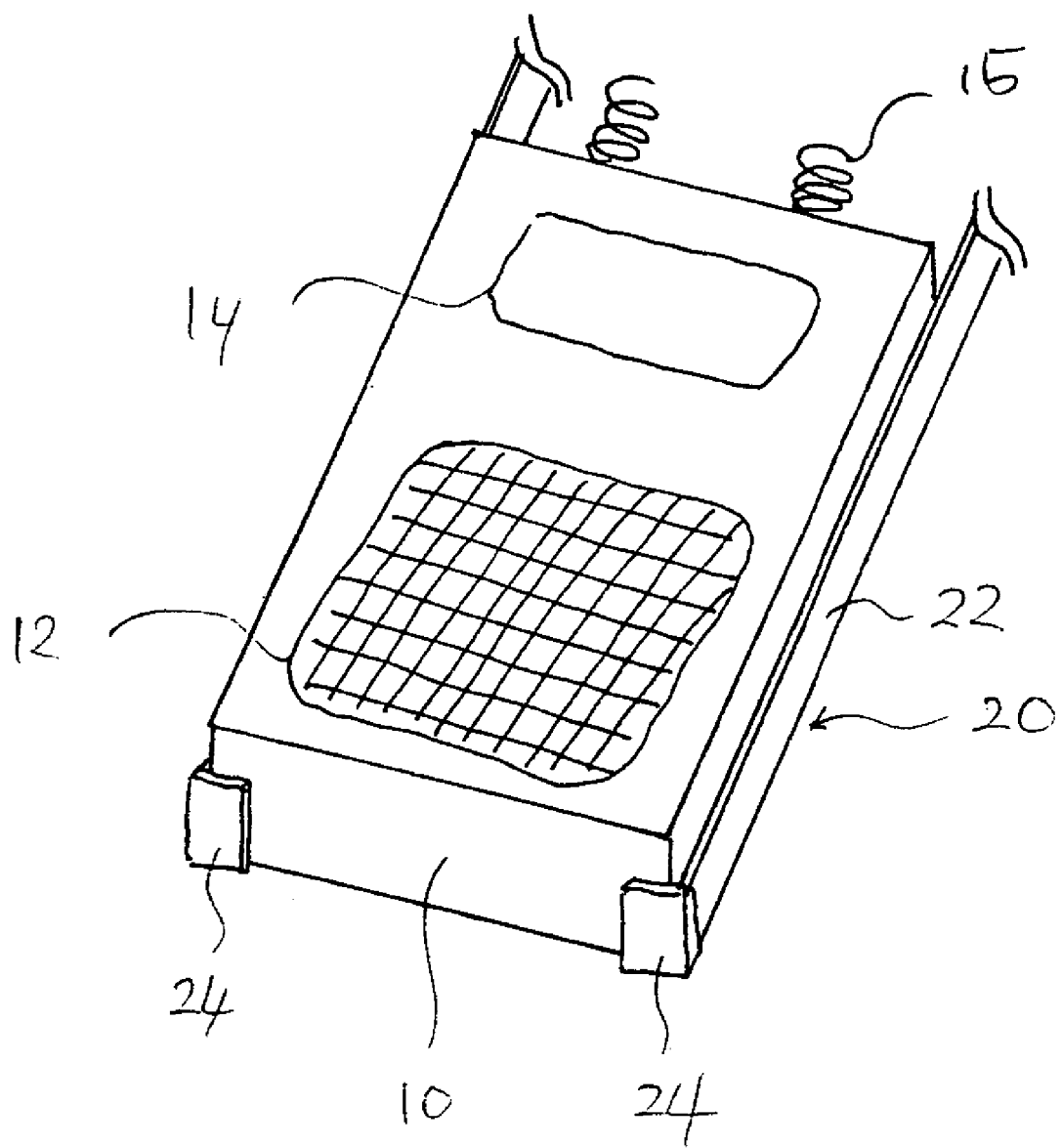
FIG. 2 is a perspective view of the weighing scale with a fixing device according to the present invention.

The refrigerator with weighing scale 100 may further include a fixing device 20 for attaching the weighing scale 10 to the bottom surface 95 of the refrigerator 90 as shown in FIG. 2. The fixing device 20 includes sliding rails 22 and stoppers 24.

The sliding rails 22 are provided on the bottom side of the refrigerator 90, and the stoppers 24 are provided at the ends of the sliding rails 22.

The weighing device 10 may include a locking device 13 and a spring 15. The weighing scale 10 is folded in and clicked to stay by the locking device 13 inside when pushed in by the predetermined pressure. The weighing scale 10 pops out due to the spring 15 when pushed in by a predetermined pressure on the retracted weighing scale.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A refrigerator with weighing scale comprising:
   a) a refrigerator comprising a chamber with a top surface, a bottom surface, a front surface, a rear surface, side surfaces, and a control board; and
   b) a weighing scale attached to the bottom surface of the refrigerator,
   wherein the weighing scale is retractable from under the bottom surface of the refrigerator.

2. The refrigerator with weighing scale of claim 1, wherein the weighing scale comprises a digital scale.

3. The refrigerator with weighing scale of claim 2, wherein the digital scale comprises a stepping pad and a display for showing the weight.

4. The refrigerator with weighing scale of claim 3, wherein the display of the digital scale is disposed on the control board of the refrigerator, wherein the display is electronically connected to the remaining portion of the digital scale.

5. The refrigerator with weighing scale of claim 4, wherein the display on the control board of the refrigerator is turned on by stepping on the stepping pad of the weighing scale.

6. The refrigerator with weighing scale of claim 4, wherein the display on the control board of the refrigerator is turned on by a control switch provided on the control board.

7. The refrigerator with weighing scale of claim 4, wherein the display on the control board of the refrigerator is turned on by being pulled out from under the bottom surface of the refrigerator.

8. The refrigerator with weighing scale of claim 1, wherein the weighing scale comprises resting props on the bottom of the weighing scale.

9. The refrigerator with weighing scale of claim 8, wherein the resting props are foldable, wherein the resting props are folded when the weighing scale is pushed in and unfolded when the weighing scale is pulled out.

10. The refrigerator with weighing scale of claim 1, wherein the weighing scale comprises an analog scale.

11. The refrigerator with weighing scale of claim 10, wherein the analog scale comprises a stepping pad and a display.

12. The refrigerator with weighing scale of claim 11, wherein the display comprises a scale-and-needle type display and a digital display.

13. The refrigerator with weighing scale of claim 1, further comprising a fixing device for attaching the weighing scale to the bottom surface of the refrigerator.

14. The refrigerator with weighing scale of claim 13, wherein the fixing device comprises sliding rails and stoppers.

15. The refrigerator with weighing scale of claim 14, wherein the sliding rails are provided on the bottom side of the refrigerator, wherein the stoppers are provided at the ends of the sliding rails.

16. The refrigerator with weighing scale of claim 1, wherein the weighing scale further comprises a locking device and a spring.

17. The refrigerator with weighing scale of claim 16, wherein the weighing scale pops out by the spring when pushed in by a predetermined pressure on the retracted weighing scale, wherein the weighing scale is folded in and clicked to stay due to the locking device inside when pushed in by the predetermined pressure.

* * * * *